US012552620B2

(12) United States Patent
Held

(10) Patent No.: US 12,552,620 B2
(45) Date of Patent: Feb. 17, 2026

(54) REMOVAL DEVICE FOR AUTOMATICALLY REMOVING FLEXIBLE MATERIAL PARTS, METHOD FOR REMOVING FLEXIBLE MATERIAL PARTS, AND PRODUCTION SYSTEM COMPRISING A CONVEYOR DEVICE AND A REMOVAL DEVICE

(71) Applicant: HEFA Holding GmbH, Heusenstamm (DE)

(72) Inventor: Gunnar Held, Heusenstamm (DE)

(73) Assignee: HEFA Holding GmbH, Heusenstamm (DE)

( * ) Notice: Subject to any disclaimer, the term of this patent is extended or adjusted under 35 U.S.C. 154(b) by 61 days.

(21) Appl. No.: 18/330,389

(22) Filed: Jun. 7, 2023

(65) Prior Publication Data

US 2024/0083696 A1 Mar. 14, 2024

Related U.S. Application Data

(63) Continuation of application No. PCT/EP2021/085025, filed on Dec. 9, 2021.

(30) Foreign Application Priority Data

Dec. 9, 2020 (DE) ..................... 10 2020 132 849.4

(51) Int. Cl.
*B65G 47/90* (2006.01)
*B65G 39/12* (2006.01)
(Continued)

(52) U.S. Cl.
CPC ........... *B65G 47/905* (2013.01); *B65G 39/12* (2013.01); *B65G 47/902* (2013.01);
(Continued)

(58) Field of Classification Search
None
See application file for complete search history.

(56) References Cited

U.S. PATENT DOCUMENTS 7,601,237 B2 * 10/2009 Burgess ............... B65H 29/008
156/265
10,710,262 B2 * 7/2020 Black ................... B25J 15/0616
2018/0154539 A1 6/2018 Black et al.

FOREIGN PATENT DOCUMENTS

DE 202007000899 U1 5/2008
DE 102006060361 A1 6/2008
(Continued)

OTHER PUBLICATIONS

PCT International Search Report of PCT Application No. PCT/EP2021/085025 Mailed on May 6, 2022.
(Continued)

*Primary Examiner* — William R Harp
(74) *Attorney, Agent, or Firm* — WTA IP Law P.C.

(57) ABSTRACT

The invention relates to a removal device for removing flexible material parts. The removal device removes at least one pliable material part from a conveyor device. A receiver is movable to a removal position via a conveyor device and contacts a region of the pliable material part to be removed. The receiver winds up part of the pliable material to be removed. The orientation of a winding device or the receiver may be pivoted and the winding device can be moved to a depositing position.

20 Claims, 7 Drawing Sheets

(51) Int. Cl.
*B65G 47/91* (2006.01)
*B65G 15/64* (2006.01)
*B65G 21/22* (2006.01)
*B65G 39/09* (2006.01)

(52) U.S. Cl.
CPC ............ *B65G 47/917* (2013.01); *B65G 15/64* (2013.01); *B65G 21/22* (2013.01); *B65G 39/09* (2013.01)

(56) References Cited

FOREIGN PATENT DOCUMENTS

| | | |
|---|---|---|
| DE | 102017203124 A1 | 8/2018 |
| EP | 1992456 A2 | 11/2008 |
| JP | S54-109769 U | 8/1979 |
| WO | WO2018153829 A1 | 8/2018 |

OTHER PUBLICATIONS

Office Action of the corresponding JP Application No. 2023-535449 mailed on Oct. 7, 2025.

\* cited by examiner

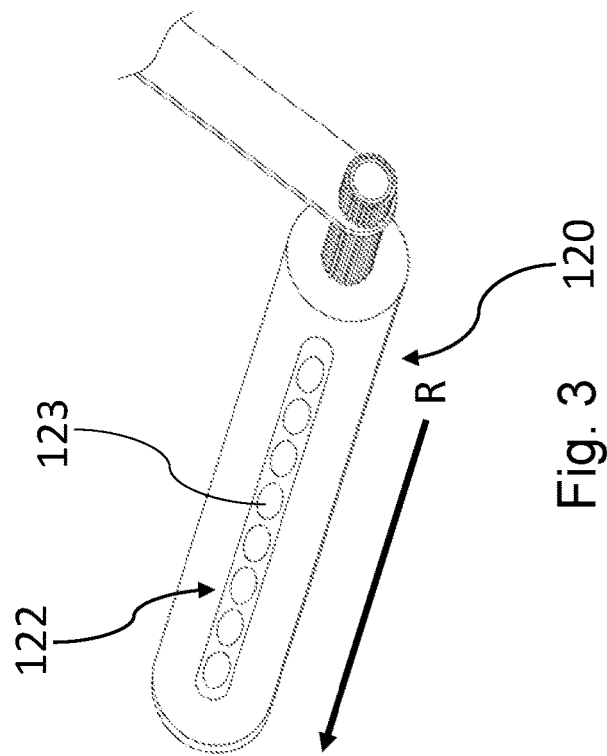
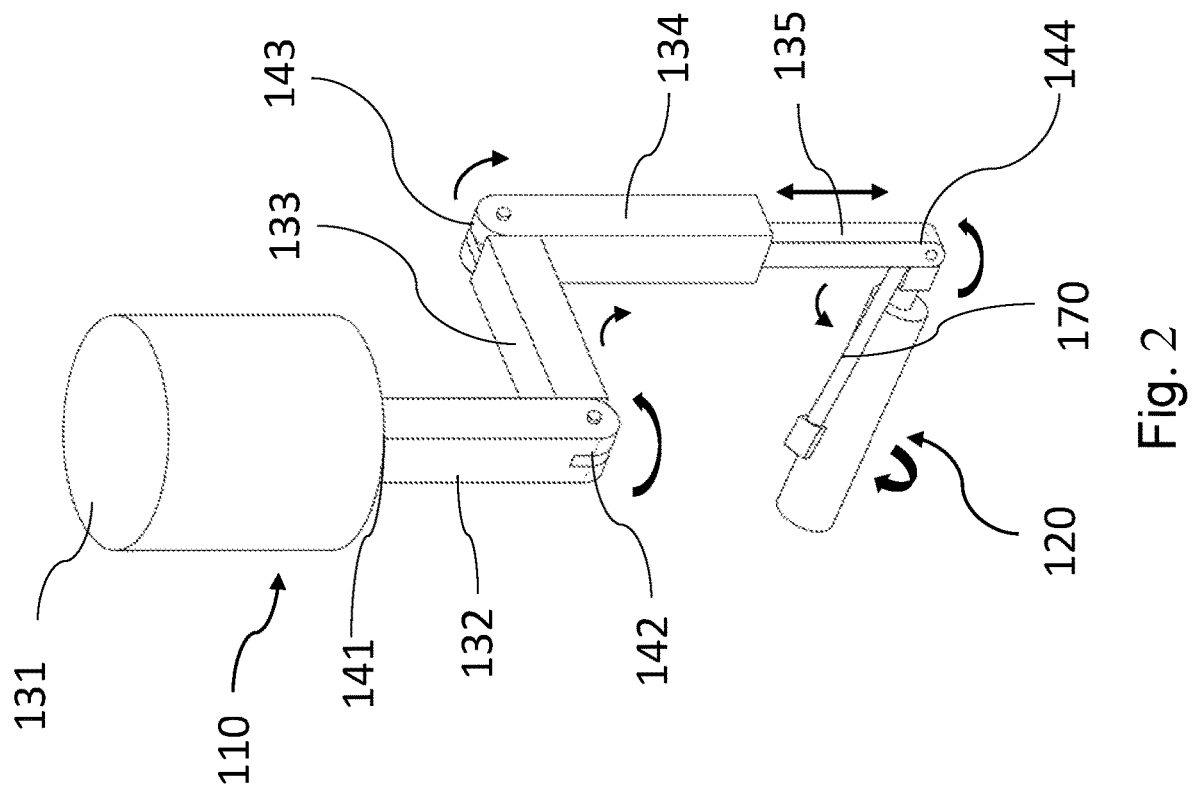
Fig. 3
Fig. 2

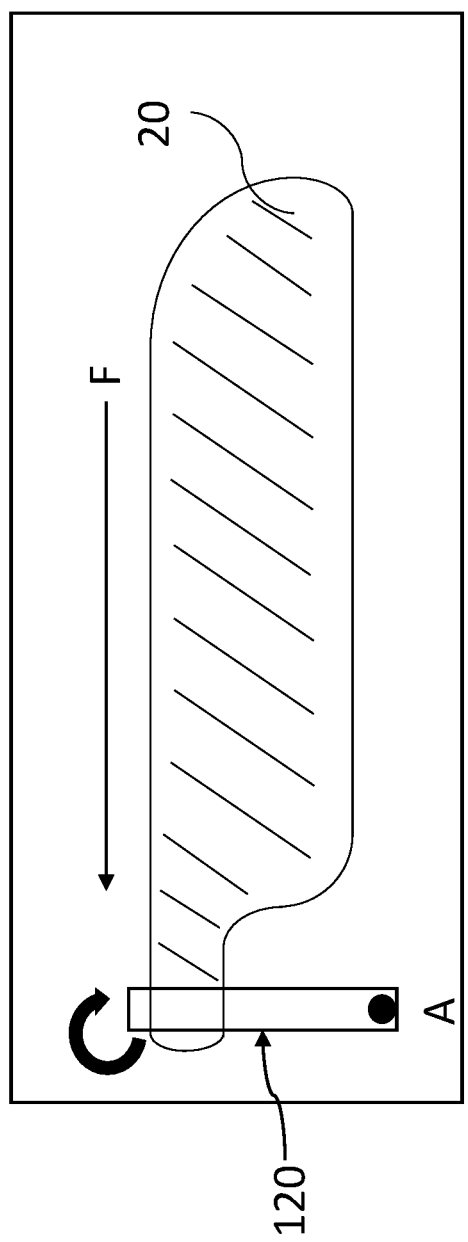
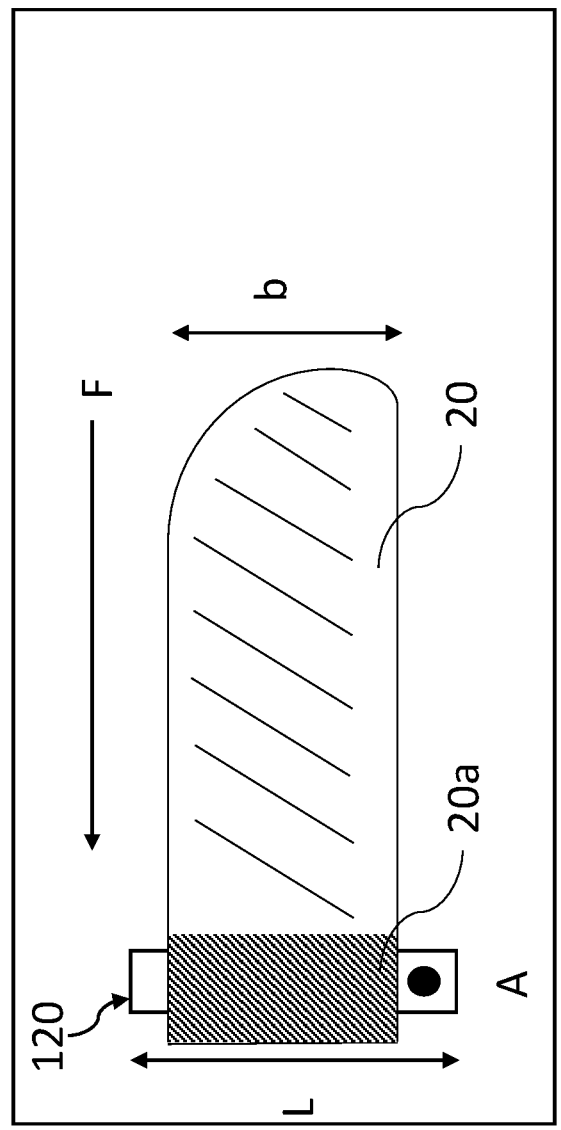
Fig. 4a
Fig. 4b

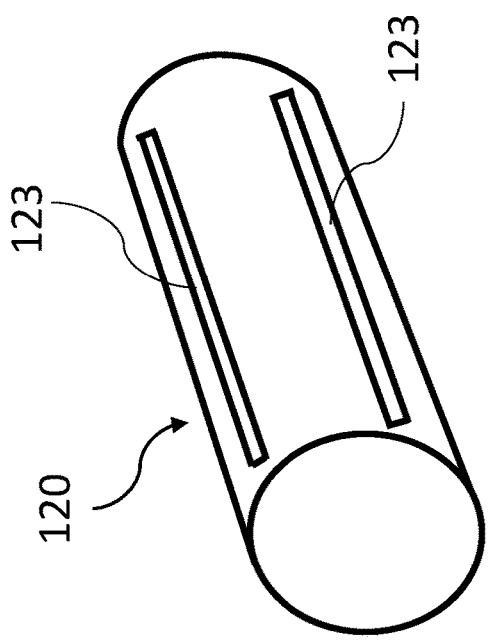
Fig. 5
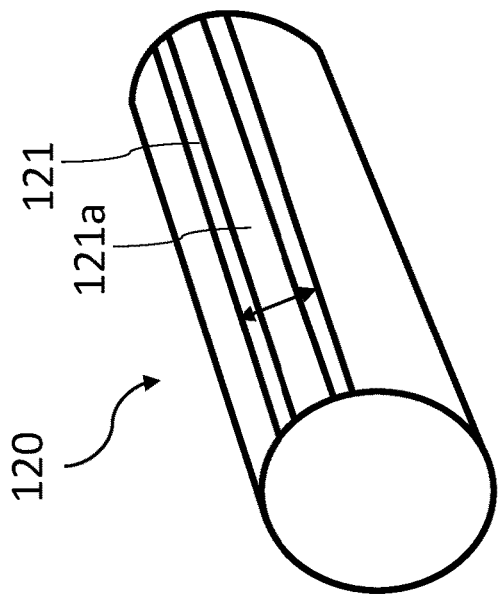
Fig. 6
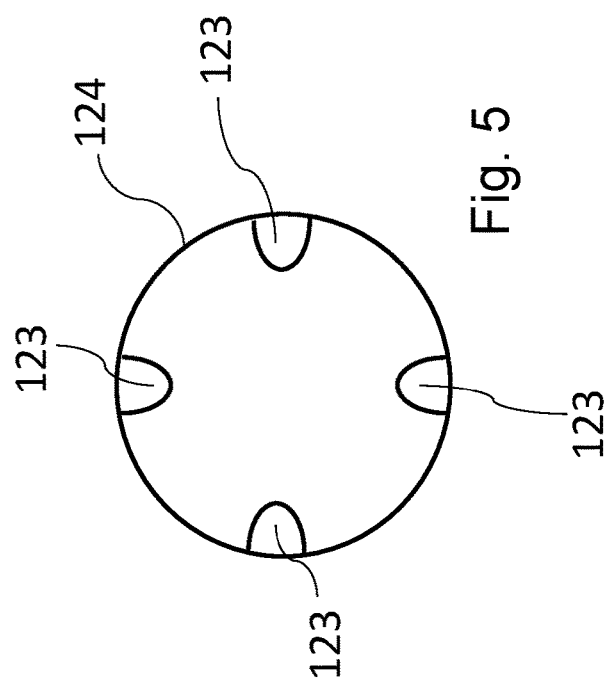
Fig. 7
Fig. 8

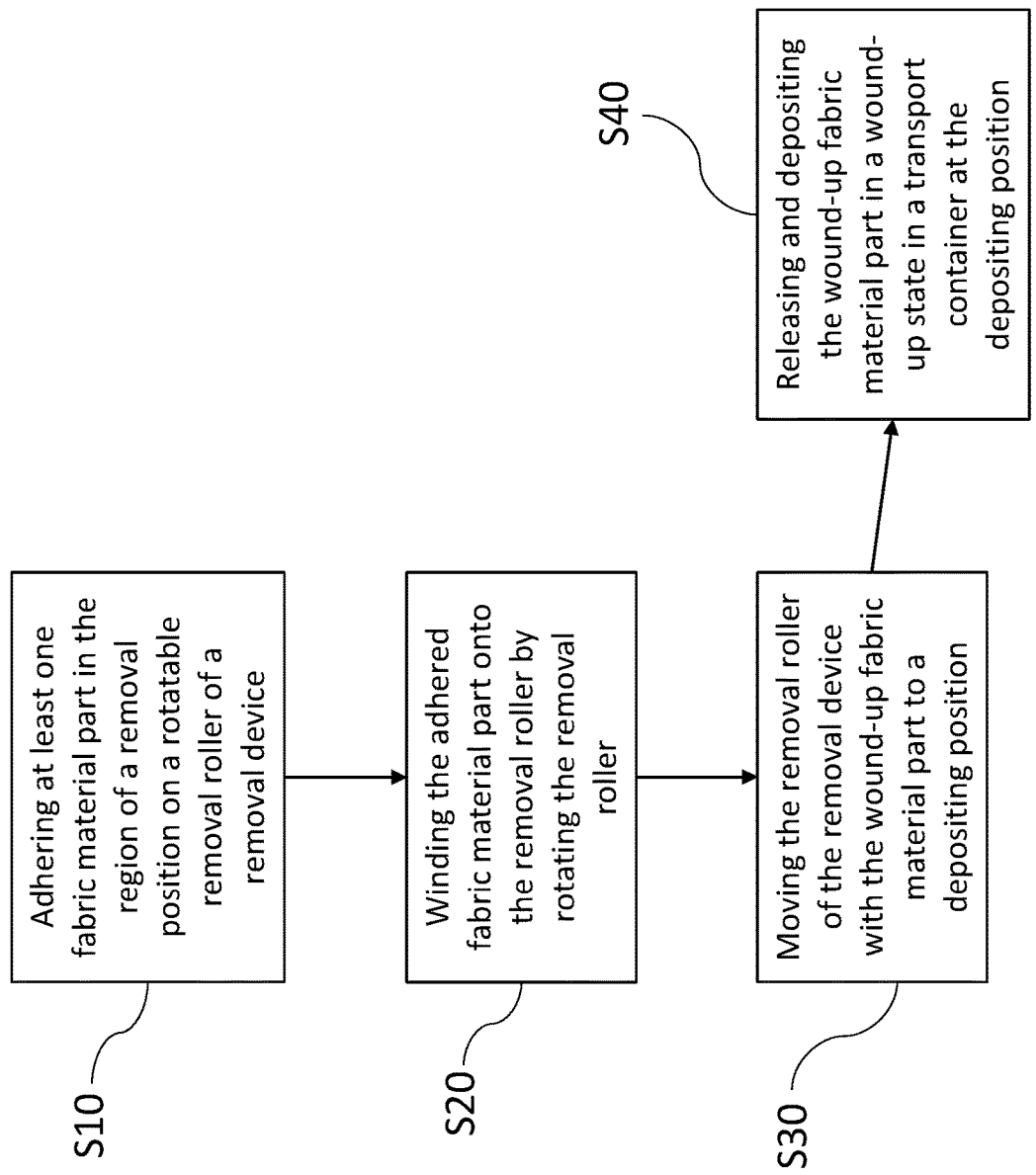

REMOVAL DEVICE FOR AUTOMATICALLY REMOVING FLEXIBLE MATERIAL PARTS, METHOD FOR REMOVING FLEXIBLE MATERIAL PARTS, AND PRODUCTION SYSTEM COMPRISING A CONVEYOR DEVICE AND A REMOVAL DEVICE

CROSS-REFERENCE TO RELATED APPLICATIONS

This is a bypass continuation application of International PCT Application No. PCT/EP2021/085025, filed on Dec. 9, 2021, which claims priority to German Patent Application No. 10 2020 132 849.4, filed on Dec. 9, 2020, which are incorporated by reference herein in their entirety.

BACKGROUND

The invention relates to a removal device for removing flexible material parts, a method for removing flexible material parts and a production facility comprising a conveyor device and a removal device.

Flexible material parts or fabric material parts, for example technical textiles, fabrics, fiber-reinforced fabrics, non-woven parts and OPW fabrics (one-piece woven) are transported on conveyor devices. Such a conveyor device is capable of conveying webs of material on a horizontal surface. The wide webs of material are processed or cut while lying on the conveyor device by a processing unit, for example a cutting device. Such material parts are usually cut using laser technology. A continuous and/or also a discontinuous cutting and conveying method may be used here. Usually, a plurality of material parts are cut from one material web in webs running side by side, and the material parts are arranged in such a way that they are offset from one another, so-called nesting, in order to obtain the highest possible yield of finished cut material parts from a strip of material.

Frequently, a plurality of material parts are cut side by side from a web, so that, after the cutting process has ended, a plurality of material parts arrive at the end of the conveyor and usually have to be removed there at the same time or almost at the same time. However, the nesting of the material parts may also result in the finished cut material parts arriving at the end of the conveyor device or at a removal position of the conveyor device in an offset manner.

Until now, the cut material parts, and in particular OPW fabric parts used for airbags, are removed from the conveyor device of the production system manually in such systems. A disadvantage of manual removal is the monotonous handling of the cut material parts, in particular the cut OPW fabric material parts, which requires a great deal of personnel.

DE 20 2007 000 899 U1 discloses a handling device for flexible, mat-like pieces of material including a handling tool and a rotationally driven winding carrier for winding a coil that is attached to a frame. The frame may be moved in space on multiple axes by a manipulator and, in particular, rotated and pivoted on multiple axes by a robot hand. As soon as the coil is finished, the manipulator transports it to the output point, e.g. to a storage table, where the piece of material is again unwound and output.

DE 10 2017 203 124 A1 shows a robot gripper for handling pliable flat material cutting. For depositing, the flat material web cuttings are unwound from a casing wall of a material receiver roll in order to deposit them unwound on a storage area.

In the production of airbags, the fabric material parts often have very large dimensions and may possibly be up to 4 m long since the airbags cover an entire length of the vehicle interior. Removing and storing such large pieces of fabric material is not only expensive, but also requires large areas of movement and correspondingly large storage areas.

In addition, when handling flexible material parts and in particular OPW fabric material parts, a so-called "sail effect" occurs due to the large dimensions, since such materials are usually only slightly permeable to air and therefore a "sail effect" occurs when moving away, which makes it more difficult to put them down repeatedly at designated storage positions or slows down rapid work.

A further requirement in addition to the effective removal of the cut material parts, even at high conveying speeds, is the damage-free handling of the material or fabric and safe removal from the conveyor device since the cut material parts consist of pliable materials or fabrics, therefore making automatic gripping or removing difficult.

It is also necessary to adapt a removal device to varying cutting patterns and varying dimensions of the material parts to be manufactured since different batch sizes of material parts are cut in such systems and the removal device is to be used flexibly for different types of materials or fabrics as well as for different sizes of the material parts.

Therefore, it is an object to provide a removal device for removing and moving one or more flexible material parts as well as a method for removing material parts from a conveyor device and a production facility comprising a conveyor device and a removal device.

SUMMARY

The present invention is therefore aimed at all pliable or flexible materials, that is these materials can be handled by the removal device according to the invention. Various examples of possible materials are given below. However, the invention is largely described on the basis of pliable OPW fabrics.

The invention is based on the principle idea of arranging a device downstream of the conveying direction, said device being able to remove at least one material part or a plurality of material parts and to move at least one material part away from the conveying direction in such a way that the space required for moving is reduced. For this purpose, the proposal according to the invention is to wind up at least one material part incoming on the conveyor device and to convey said material part further in a wound up state and, if applicable, to deposit said material part in a wound up state in prepared containers. By using of a plurality of winding devices or the staggered use of a single winding device for adjacent webs of material, material parts can also be handled in the case of a multi-lane supply of material parts.

According to one aspect, a removal device for removing at least one pliable material part from a conveyor device is provided, comprising: at least one winding device including a receiver that can be moved to a removal position A above the conveyor device and is configured to receive a region of a material part to be removed from the conveyor and to wind it around the receiver, wherein the winding device, after winding up the material part to be removed, is pivotable in its orientation and can be moved to a depositing position, wherein the winding device is configured to transport the material part wound around the receiver to a transport container at the depositing position and to deposit the wound-up material part in a wound-up state.

Preferably, the receiver may contact the material part to be removed in a substantially horizontal longitudinal orientation of the receiver.

Preferably, a plurality of winding devices may be arranged, with each winding device being assigned to a region of the conveyor device. As a result, a plurality of material parts can be removed and deposited simultaneously or quasi-parallel or independently of one another.

The winding device may be configured, for example, as a tripod, hexapod or parallel kinematics robot or articulated arm robot. In the simplest case, the winding device comprises three axes in the X, Y and Z directions, along which the receiver can be moved, with the X direction corresponding to the conveying direction of the material parts, the Y direction extending transversely to the conveying direction and the Z direction corresponding to the vertical orientation.

The winding device may be coupled to the receiver by means of a hinge in order to change the orientation of the receiver depending on the receiver operation or deposit operation.

Preferably, the winding device may be movable in height relative to the conveyor device and/or be movable or traversable from a removal position to a depositing position. The one or more material parts can thus be removed from the conveyor device and deposited at another location. According to the invention, the transport takes place in a wound-up state so that the handling of the material parts, which are sometimes very large, and also the space required for transport are considerably reduced.

Preferably, the receiver may include a gripping device for adhering or fixing a material part incoming on the conveyor device to a surface of the receiver in order to wind it up.

Furthermore or alternatively, the receiver may comprise a suction device for adhering a material part incoming on the conveyor device to a surface of the receiver. As a result, the material part is received by the conveyor device and can be wound up around the receiver.

The receiver may also be referred to as a receiver device or removal element.

Preferably, the receiver is rotatably hinged on the winding device. As a result, the material part to be received can perform a rotational movement about the longitudinal axis, preferably after adhering to the receiver, in order to thus wind the material part around the receiver.

The receiver may be configured as a cylindrical body, which preferably has a width or longitudinal extent that corresponds at least to the width of a piece of material.

Preferably, the suction device may have one or more openings arranged on the surface of the receiver.

The one or more openings may also be distributed as grooves or rows of openings on the surface of the receiver. The one or more openings may be distributed both in the direction of the longitudinal axis and in the circumferential direction in order to thus generate a suction effect at all times and allow for a material part to be received. This results in the advantage that a larger area of the fabric material part can be sucked in and thus better adheres to the receiver. Further, no matter which direction it rotates, the receiver can suck in the fabric material part and thereby attract the fabric material part.

In order to ensure effective adhesion, the one or more openings may be subjected to negative pressure. In this way, an incoming material part can be reliably adhered to the surface of the receiver.

The surface of the receiver may have a structure that enables adhesion, e.g. a rubberized surface with microstructures.

In order to enable effective detachment of a material part wound onto the receiver, the one or more openings may also be subjected to a positive pressure. It is thus possible to facilitate depositing or detaching the wound-up material part from the receiver by means of the positive pressure.

To deposit the fabric material parts in the transport box, the suction device is pressurized to cause the fabric material parts to be detached from the receiver.

The suction device of the receiver may be formed as a row of openings. A plurality of openings or row of openings may also be distributed over the circumference of the receiver in order to ensure that the fabric material part is sucked in or adheres at every rotational position of the receiver as far as possible.

The gripping device may be formed as a gap between the surface of the receiver and the gripping device so that a material part incoming on the conveyor device can be inserted into the gap. The gripping device may be formed as a bracket or flap on the receiver, wherein the gap can be reduced after the insertion of the material part in order to cause clamping. The receiver can then wind up the material part by means of a rotational movement.

The winding device may further include a clamping device which fastens the wound-up material part to the receiver. This means that after the material part has been wound up on the receiver, the clamping device flips onto the wound-up material part and thus prevents unintentional unwinding.

Here, the clamping device may be attached to the receiver or to a holder of the receiver or to the winding device and be movable toward the receiver after a winding operation in order to fix the wound-up material part on the receiver.

During a depositing process, the clamping device can be moved away from the receiver with the wound-up material part in order to release the wound-up material part.

Preferably, an axis of rotation of the receiver is essentially horizontal or slightly inclined in the region of the removal position of the material part from the conveyor device and oriented substantially transversely or perpendicularly to a conveying direction of the conveying device.

An axis of rotation of the receiver is preferably oriented horizontally or vertically in the region of the depositing position. Depending on the position at which the wound-up piece of material is deposited or at which a storage box is arranged, the axis of rotation of the receiver can be pivoted in order to deposit the wound-up material part.

The receiver may be moved upwards from a conveying plane after the material part has adhered to the receiver.

As a result, the winding process of the receiver can then take place at a predetermined distance from the conveying plane. This facilitates the winding process.

Preferably, after the material part has been wound up, the receiver can be moved with the wound-up material part to the transport container in order to deposit the wound-up material part there in the wound-up state.

The winding device may include at least one joint which enables positioning and pivoting of the receiver.

The winding device may be adjustable in height in order to be raised from the conveying plane or from the removal position A and to be moved after pivoting to the level of a transport container or a depositing position.

The removal device may further comprise a frame to which one or more winding devices are attached, the frame being wider than a width of the conveyor.

The material part may preferably be flexible and/or pliable.

It may also be single-layer or multi-layer.

Preferably, the material part is an airbag or OPW fabric or a technical textile, a cloth, a fiber-reinforced fabric, a non-woven material, a carbon fiber material, paper, glass fiber material or a seat cover material.

The material part can preferably comprise coated or uncoated, single-layer or multi-layer metal or plastic foils.

A removal system according to the invention may comprise a transport container which can receive at least one wound-up material part and is positioned in the region of the depositing position in order to receive the wound-up fabric material part from the receiver.

The transport container may have a partitioning structure, with a wound-up material part being received in each of the depositing regions formed by the partitioning structure.

The transport container may have a plurality of depositing regions, each depositing regions having a depth that is greater than the diameter or width of the depositing region.

The depth of the depositing region preferably corresponds to at least the width of a material part. However, it is also possible for the wound-up material part to protrude from the depositing region. Preferably, the depth of the depositing region should be greater than half the width of a material part.

The removal system may further comprise a conveyor belt on which one or more transport containers can be transported to the depositing position and, after being filled with one or more wound-up fabric material parts, can be transported away from the depositing position.

In a particular embodiment, the conveying direction of the conveyor belt in the region of the depositing position may run transversely to the conveying direction of the conveying device and/or the depositing position may be arranged to the right and/or left or to the side of the conveying device.

A system for transporting away fabric material parts is also provided, comprising: a conveying device which has a horizontally arranged conveying plane on which at least one fabric material part is conveyed and includes a removal device described above.

The material parts may be conveyed continuously or discontinuously. That is, with the removal device according to the invention, the material parts can be picked up and wound up by the conveying device both from the conveying movement and from a rest position during stop-and-go operation of the conveying device.

Furthermore, a facility for cutting and transporting fabric material parts is provided, comprising: a removal system as described above, which includes a processing unit for cutting material parts from a web of material lying on the conveyor.

A method for removing a material part lying on a conveying device comprises the steps of: adhering at least one material part in the region of a removal position to a rotatable receiver of a removal device; winding the adhered piece of material onto the receiver by rotating the receiver; moving the receiver of the receiving device with the wound-up material part to a depositing position; releasing and/or depositing the wound-up material part in a wound-up state in or on a transport container at the depositing position.

The winding device may comprise a guiding device arranged at a distance from the receiver. The guiding device has a slightly curved shape corresponding to the circumference of the receiver. The guiding device ensures that a fabric material part can be wound up safely.

The transport device may have a plurality of depositing regions formed by the partitioning structures. The depositing regions are configured as compartments, for example, and serve to store the wound-up fabric material parts, with each depositing region being provided with one fabric material part.

Each compartment or depositing region may have a region that narrows in diameter so that, when the fabric material part is inserted into the depositing region, clamping is effected and thus the wound-up fabric material part is kept securely in the depositing region. A flexible projection may also be provided in the upper region of the compartment, which allows easy insertion of the fabric material part, but forms a resistance to a removal movement and thus holds the wound-up fabric material part in the depositing region like a barb.

The receiver may have adhesive regions to allow adhesion of the fabric material part to be wound up.

The receiver may have small needles or a rough surface in order so that the fabric material part to be wound up can adhere to the surface of the receiver.

The fabric material parts may be formed as material parts that are cut out of a flexible material in order to allow for winding, such as airbags or airbag parts. The material may be a flexible material, in particular in the form of technical textiles or fabrics (woven, non-woven), carbon fiber, paper, glass fiber, airbag or OPW fabric, seat covers, fleece material or coated or uncoated, single or multi-layer metal or plastic foils which are conveyed on a substantially horizontal conveyor.

Preferably, at least one of the joints is configured as a rotary joint in order to allow rotation of the first articulated arm, the second articulated arm and/or the third articulated arm about the corresponding longitudinal axis.

When winding the fabric material part onto the rotatable receiver, the axis of rotation R of the receiver is arranged transversely to the horizontal plane of the conveyor device on which the fabric material part rests.

The receiver may rotate either clockwise or counterclockwise about its axis of rotation R during winding.

The winding device may be adjustable transversely to the conveying direction F of the conveyor so that the winding device can wind up the fabric material part at different positions in relation to the conveying direction F of the conveyor device.

The winding device may be adjustable along the conveying direction of the conveyor device.

The winding device may be adjustable in the vertical direction.

The depositing position B may be higher, lower or at the same level as the removal position A on the conveyor device on which the fabric material part rests.

The receiver may be configured as a removal roller.

The removal roller can have a circular or polygonal cross-section. The removal roller may be configured as a cylindrical body extending along its axis of rotation.

The winding device may be moved in the conveying direction of the conveying device after the fabric material part has been wound up and the fabric material part may be released at the depositing position, the receiver being positioned predominantly vertically with its axis of rotation during the depositing process of the fabric material part.

A plurality of winding devices may be arranged spaced apart from one another, with each winding device being assigned to a respective conveying lane of fabric material parts of the conveying device.

BRIEF DESCRIPTION OF THE DRAWINGS

The invention is described in more detail below with reference to figures. In the figures:

FIG. 2 shows a schematic view of a winding device;

FIG. 3 shows a schematic view of a removal roller of the winding device;

FIGS. 4a, 4b show a schematic view of a winding process of a cut-out material part onto the removal roller;

FIG. 5 is a cross-section of a removal roller with a plurality of openings;

FIG. 6 is a schematic view of the removal roller with a plurality of openings;

FIG. 7 shows a cross-section of a removal roller with a gripping device;

FIG. 8 shows a schematic view of the removal roller with a gripping device;

FIG. 12 shows a method according to the invention.

DETAILED DESCRIPTION OF EMBODIMENTS

Figure 1:
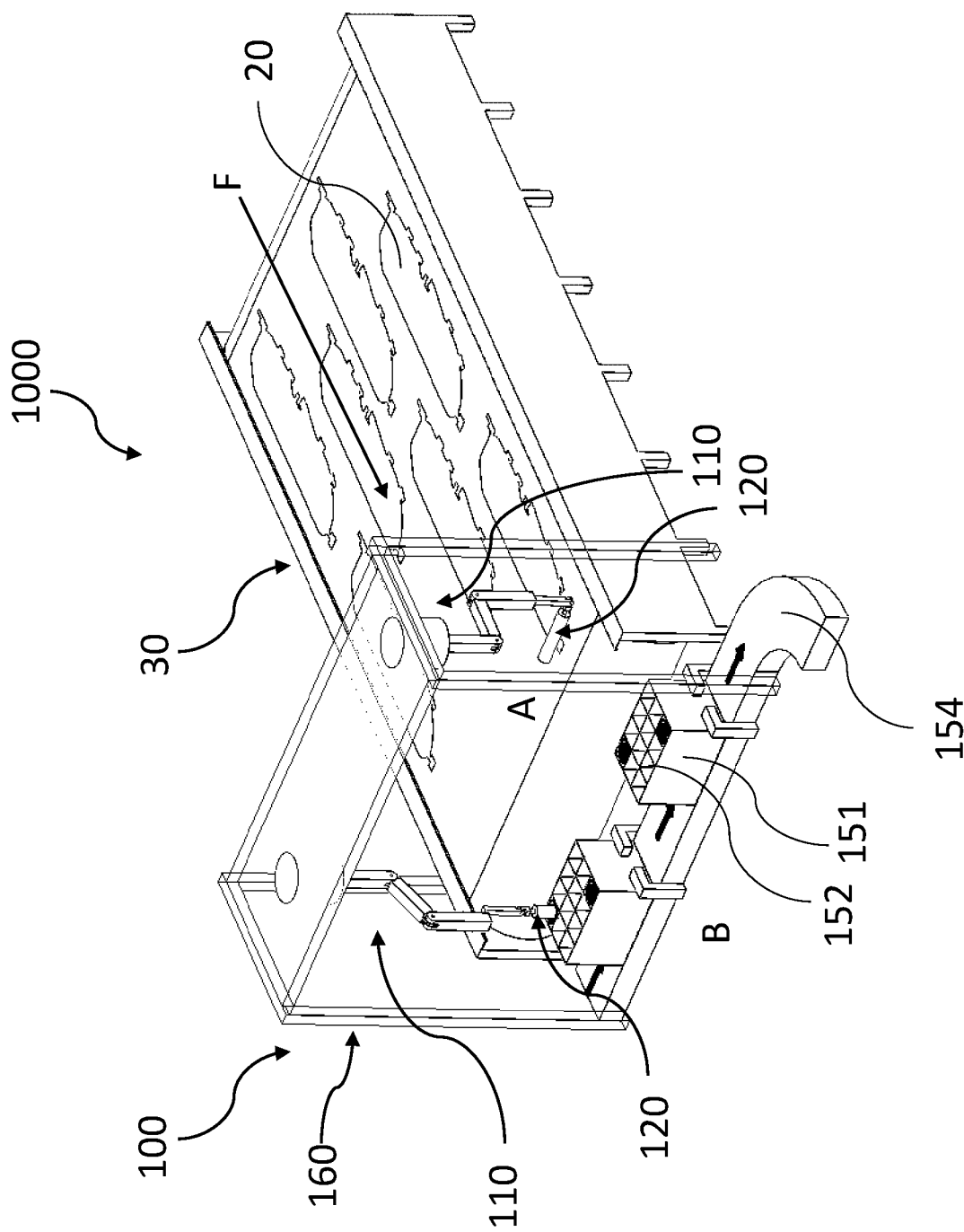
FIG. 1 shows a perspective view of a system for transporting away material parts.

A perspective view of a system for transporting away flexible or pliable material parts 20 is shown in FIG. 1. The pliable or flexible material parts 20 arrive on a conveyor device 30, which is configured as a conveyor belt, for example, and are conveyed in the conveying direction F.

The removal device 100 according to the invention is arranged, for example, at the end of the conveyor device 30 and receives the incoming material parts 20 at a depositing position A and transports them from a removal position A to a depositing position B.

The removal device 100 includes one or more winding devices 110 arranged on a frame 160.

Each winding device 110 includes a receiver 120, hereinafter shown as removal roller 120. FIG. At the removal position A, the removal roller 120 is oriented substantially horizontally and transversely to the conveying direction F and can wind up an incoming material part 20. The removal roller 120 has a length L which corresponds at least to the width b of a material part 20 (see FIG. 4b).

After the material part 20 has been wound onto the removal roller 120, the winding device 110 is moved to the depositing position B, at which the wound-up material part 20a is deposited in a transport container 151. The transport containers 151 are constructed in a box shape, for example, and have a partitioning structure 152 that forms a plurality of depositing regions 153, with the wound-up material part 20a being introduced into a depositing region 153 and deposited there.

After a transport container 151 has been filled completely, i.e. all depositing regions 153 have each been filled with a wound-up material part 20a, the transport container 151 is transported away via a conveyor belt 154 and an empty transport container 151 is transported to depositing position B in order to be filled again. The conveyor belt 154 is preferably arranged orthogonally to the conveying direction. However, it is also possible to position one or more conveyor belts 154 to the right and/or left of the conveyor device 30 in order to deposit the wound-up material parts 20.

The figures have been described using fabric material parts 20 as well as material parts 20, the two terms being used synonymously here.

In order to present the invention in simple terms, already cut fabric material parts 20 are shown on the conveyor device 30 as being arranged offset to one another in a plurality of lanes and being conveyed in the conveying direction F. Viewed in the conveying direction F, a cutting or processing device 200 (not shown in FIG. 1, see FIG. 11 and FIG. 12) configured to cut a wide web of fabric or material is arranged in front of the removal device 100 (opposite to the conveying direction F). This cutting or processing device 200 may be configured as a laser cutting device and may cut out the fabric material parts 20 from the supplied material web or the fabric web, preferably with maximum yield. At the end of the conveying device 30 (in the conveying direction F), the removal device 100 is arranged or configured in such a way that it can access the conveying plane of the conveying device 30 and the material parts 20 resting thereon from above.

It is not shown in more detail in the figures and is also not essential for the invention, but for a cutting system it is necessary to separate the residual material or the residual fabric from the cut-out material parts before they are wound up by the removal device 100 according to the invention and transported away.

The removal device 100 comprises a frame 160. The frame 160 may, for example, include four vertical struts. A top cover may be provided in the upper region. The frame 160 is configured such that it is arranged above the conveyor device 30.

One or more winding devices 110 are attached to the frame 160, said winding devices 110 being firmly fixed to the frame 160 or, in another embodiment, movable or shiftable or displaceable in their position relative to the frame so as to be adapted to different conveyor devices or different removal positions due to different material web widths. The one or more winding devices 110 may also be arranged differently to access the material parts moved on the conveyor device 30.

A removal device 100 includes one or more winding devices 110 mounted on the frame 160 and adapted to receive one or more fabric material parts 20 from the conveyor device 30 at the removal position A, respectively.

Each winding device 110 includes a removal roller 120 with which a fabric material part 20 which is to removed and is located at a removal position A on the conveyor device 30 is contacted, the winding device 110 adhering the fabric material part 20 to be removed to the removal roller 120 and winding it up around the removal roller 120.

Thereafter, the winding device 110 moves the wound-up fabric material part 20 to a transport container 151 located at the depositing position B. The wound-up fabric material part 20 is deposited there in the transport container 151 in a wound-up state.

The structure of a winding device 110 is described in more detail with reference to FIGS. 2, 3 and FIGS. 5-9.

In FIG. 2, a winding device according to the invention 110 is shown. In the example according to FIG. 2, the winding device 110 includes a base 131 connected to a first articulated arm 132. The first articulated arm 132 is connected to a second articulated arm 133 and the second articulated arm 133 is connected to a third articulated arm 134. The removal roller 120 is hinged on the third articulated arm 134. The winding device 110 may perform movements in the most varied of directions.

The first joint 141, the second joint 142, the third joint 143 and the fourth joint 144 may be configured either as translatory joints, rotary joints or as a combination thereof. A translatory joint connects two linear axes, with the next articulated arm moving on a straight path by means of the translatory joint. The translational joint is mounted on roller or sliding bearings. A rotary joint allows the connected articulated arms to rotate around an axis of rotation so that the next articulated arm respectively rotates around an axis of rotation. The assembly takes place on rotary bearings. The axis of rotation of the joint may run along the longitudinal axis or transversely to the longitudinal extension of the articulated arm. By means of a ball joint, different axes of rotation are possible.

Thus, it is possible that the first articulated arm 132 can be rotated about its longitudinal axis. The first articulated arm 132 is connected to the second articulated arm 133 via a joint 142, as a result of which the second articulated arm 133 can be pivoted out of a horizontal position in order to position the removal roller 120 lower. The rotary movement of the first articulated arm 132 about its own longitudinal axis allows the removal roller 120 to be moved in a large radius around the base 131 of the winding device 110.

The second articulated arm 133 is connected to the third articulated arm 134 by means of a second joint 143 so as to also move it with a rotational movement.

The third articulated arm 134 is adjustable in its longitudinal extent by including an extendable element 135 in the articulated arm 134 to which the removal roller 120 is attached. Due to the adjustability in longitudinal extent, the removal roller 120 can thus be lowered onto the conveying plane in order to receive the incoming material part 20 there. The removal roller 120 is connected to a third joint 144 at the lower end of the third articulated arm 134 and can be moved from the horizontal to a vertical or also to an angled position there.

In FIG. 2, the first joint 141 is configured as a rotary joint which allows rotation of the first articulated arm 132 about its longitudinal axis. The second joint 142 is also implemented as a rotary joint and allows rotation of the second articulated arm 133 orthogonal to the longitudinal axis of the first articulated arm 132. The third joint 143 is also a rotary joint and allows rotation orthogonal to the longitudinal axis of the second articulated arm 133. The fourth joint 144 allows rotation about two axes of rotation, the first axis of rotation enabling rotation of the removal roller 120 about its longitudinal axis of the third articulated arm 134 and the second axis of rotation enabling rotation or pivoting of the removal roller 120 from the horizontal to the vertical. Moreover, the removal roller 120 is rotatable about its own longitudinal axis. Thus, the removal roller 120 can reach or be placed at any point in the spherical space defined by the center of the fourth joint 144 and the length of the removal roller 120.

The removal roller 120 can rotate horizontally and vertically about its longitudinal axis.

The winding device 110 also includes a clamping device 170 implemented, for example, in the form of a rod. For example, the clamping device 170 may be arranged on the third articulated arm 134 or on a holder of the removal roller 120. The clamping device 170 may clamp the wound-up material part 20a after a winding-up process in order to prevent the fabric material part from unintentionally unwinding from the removal roller 120. The clamping device 170 has the function of holding the fabric material part 20 on the removal roller 120 after a fabric material part 20 has been completely wound up on the removal roller 120. Before and during the winding of the fabric material part 20, the clamping device 170 is in a rest position, i.e. at a sufficient distance from the peripheral surface 124 of the removal roller 120.

After the fabric material part 20 has been completely wound up onto the removal roller 120, the clamping device 170 is moved, rotated or folded from its rest position to a clamping position, so that the clamping device 170 comes into contact with the wound-up fabric material part 20 and exerts a sufficient force on the wound-up fabric material parts 20 so that the fabric material part 20 is prevented from unwinding from the removal roller 120. At least one region of the clamping device 170 may be adapted to the curved surface of the removal roller or of the fabric material part wound onto the removal roller in order to better bear against the fabric material part.

The force required to be exerted by the clamping device 170 on the wound-up fabric material part in order to prevent it from unwinding can vary due to different materials or different sizes of the cut material parts and the resulting different radii on the removal roller and is monitored and adjusted by the control.

For example, it may be determined by a sensor whether the force exerted by the clamping device 170 on the fabric material part 20 corresponds to a preset force.

Alternatively, it is possible that the clamping device 170 is mounted resiliently and folded out in the relaxed state and thus presses on the wound-up fabric material part 20 with the spring force. For the winding and depositing process of the fabric material part 20, the clamping device 170 is pulled or folded in the direction of the winding device, in particular in the direction of the third articulated arm 134.

The at least one winding device 110 is fastened to the frame 160, the entirety or at least parts of the winding device 110 being movable in the conveying direction F and opposite to the conveying direction F. For this purpose, a guide or rail (not shown) is formed in the upper region of the frame 160, for example on the top cover, for each winding device 110, extends in parallel to the conveying direction F and allows for a movement of the winding device 110 in and against the conveying direction F.

In addition, each winding device 110 can be moved orthogonally or transversely to the conveying direction F along a guide or rail (not shown). Thus, the winding device 110 can be positioned at different positions in relation to the conveying direction F and can be adjusted orthogonally to the conveying direction F along the guide.

In order to prevent collisions between adjacent winding devices 110, the guides of the winding devices 110 are positioned on the frame 160 in such a way that a sufficiently large distance between the winding devices 110 is ensured.

It is thus possible to define, for each winding device 110, a working region in the frame space, in which the winding device 110 can move freely. Each winding device 110 is assigned a region on the conveyor device 30 in which the removal position A is located and at which the corresponding winding device 110 can receive the fabric material part 20. Furthermore, each winding device 110 is assigned to a depositing position B, with the winding device 110 being able to be moved to the depositing position B. The winding device 110 deposits the wound-up fabric material part 20a at the respective depositing position B.

At a removal position A on the conveyor device 30, the winding device 110 winds up a fabric material part 20 and transports it to a depositing position B, where the winding device 110 deposits the fabric material part 20 in a transport container 151. The transport container 151 includes a partitioning structure 152 which forms a plurality of depositing regions 153 in the transport container 151. Each fabric material part 20 is deposited in a wound-up state in a corresponding depositing region 153. The partitioning structure 152 may, for example, be in the form of a rectangular lattice and form a plurality of rectangular depositing regions 153 or else tubular depositing regions 153. Each depositing region 153 is configured as a cuboid or hollow cylinder. For example, the transport container 151 is configured similar to a beer crate.

In FIG. 2, the articulated arms are shown with a rectangular or square cross-section. However, it is also possible to from them with a cylindrical or round cross-section, as a result of which a rotational movement can be realized within the articulated arm. It is also possible to form each of the articulated arms with a longitudinal displaceability similar to that of the third articulated arm. As a result, the adjustment possibilities of the winding device 110 can be increased.

On the other hand, it is also possible to move the removal roller 120 between the removal position and the depositing position B by means of a very simple adjustment structure. In a simple embodiment, only translational displaceability along the conveying direction is necessary. This can be realized by a support rail on the frame 160. A vertical element, which can be adjusted in length, is fastened to this support rail and the removal roller 120 is fastened to its lower end. The removal roller 120 can thus be positioned at the removal position A by translational and vertical displacement in order to wind up the material part 20. Thereafter, the removal roller 120 may be raised and conveyed via the support rail in the conveying direction to the depositing position B.

In FIG. 3, a removal roller 120 is shown in detail. The removal roller 120 has a cylindrical shape with a longitudinal axis of rotation R about which the removal roller 120 is rotated. The removal roller 120 has a surface 124 in or on which a suction device 122 is formed. The suction device 122 may include a plurality of openings 123 to which a positive pressure or a negative pressure can be applied.

In order to cause material parts 20 to adhere during the winding process, the openings 123 are subjected to a negative pressure, which can be supplied via the winding device 110, in order to thus adhere the material part 20 to the removal roller 120 and to start the winding process with a subsequent rotational movement of the removal roller 120. The positive or negative pressure can be supplied through hose lines via the articulated arms. However, it is also possible to generate the positive or negative pressure in the removal roller 120. The controller controls the duration, the point in time and/or the amount of the positive or negative pressure. One or more contact sensors on the removal roller 120 determine whether the fabric material part 20 is in contact with the removal roller 120. The rotational movement of the removal roller 120 may then start, with the negative pressure also being maintained for the duration of the winding, if necessary, and being switched off only after the clamping device 170 has been folded open.

One or more contact sensors on the removal roller determine whether the fabric material part 20 has already become detached from the removal roller when it is detached. Then the supply of positive pressure may be switched off.

Alternatively or additionally, the control of the supply of positive or negative pressure may also be time-based or event-controlled.

The winding process is shown in FIGS. 4A and 4B in detail. The removal roller 120 arranged in the removal area A carries out an adhesion process for the incoming material part 20 by means of the suction device 122 and a negative pressure supplied so that the material part 20 is received by the conveying plane or the conveyor belt of the conveyor device 30 and adheres to the surface 124 of the removal roller 120. The removal roller 120 then rotates and a winding operation is performed, which is partially shown in FIG. 4B and shows a material part 20 which is already partially wound.

In FIG. 5, a removal roller 120 is shown in cross section. Here it is shown that the removal roller 120 may have openings 123 of the suction device 122, which can be subjected to positive or negative pressure, at various positions, making it possible to receive the material part 20 at as many points as possible on the removal roller 120 and to adhere it there in order to start the winding process.

In FIG. 6, the removal roller 120 is shown in a perspective view, the openings 123 are shown here as longitudinal grooves and can be configured as a common opening or as many small openings.

In FIG. 7 a cross-section of a removal roller 120 is shown, wherein a gripping device 121 is present in a region of the removal roller 120, which forms a gap 121a into which an incoming material part 20 is introduced, wherein the gap 121a can be reduced after inserting the material part 20 into the gap 121a in order to effect clamping of the can be reduced 20 on the removal roller 120 and to wind the material part 20 around the removal roller 120 by means of a subsequent rotational movement.

FIG. 8 shows a perspective view of the removal roller 120 including a gripping device 121, wherein two brackets or flaps are shown here, which form a gap 121a that can be reduced after introducing the material part 20 into the gap 121a in order to effect clamping.

Figure 9:
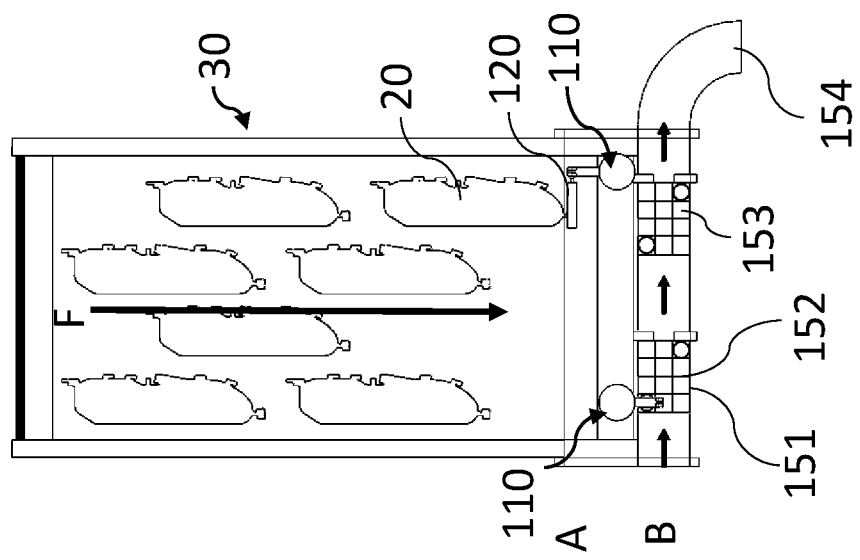
FIG. 9 is a plan view of a system for transporting away fabric material parts.

FIG. 9 shows a plan view of a system for transporting away material parts 20. In analogy to the representation in FIG. 1, the incoming material parts 20 are moved on the conveyor device 30 in the conveying direction F so as to be wound up at a removal position A by a removal roller 120 of the at least one winding device 110. After one winding device 110 has wound up a material part 20, this winding device 110 (shown on the left) with the wound-up material part 20a is moved to depositing position B in order to place the wound-up material part 20a there in a depositing region 153 of a transport container 151.

Figure 10:
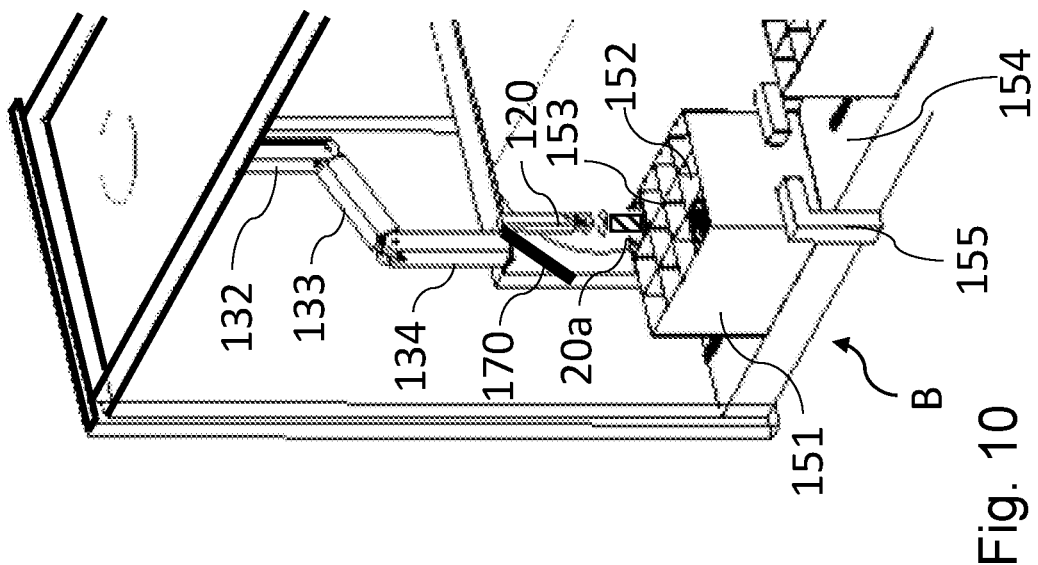
FIG. 10 shows a schematic view of the removal device when depositing a material part.

In this regard, reference is made to FIG. 10 in which the deposition of a wound-up material part 20a is shown in more detail. The winding device 110 with the removal roller 120 has moved or been moved into the area of the depositing position B with the wound-up material part 20a. There, the removal roller 120 was pivoted into a vertical position. For the depositing process of the wound-up material part 20a, the winding device 110 moves into the area of a designated depositing region 153 that is still empty in the transport container 151. The material part 20a is then inserted into the free depositing region 153 and deposited.

The depositing regions 153 in the transport container 151 have a depth which corresponds approximately to the width of a material part 20. The width or the diameter of a depositing region 153 is wide enough to receive a wound-up material part 20a.

Retaining means may be arranged in the upper area of a depositing region 153, said retaining means enabling a wound-up material part 20a to be inserted or introduced, but preventing the wound-up material part 20a from being pulled up when the removal roller 120 is moved out so that the wound-up material part 20a remains in the depositing region 153. In order to further simplify the depositing process, it is possible to apply positive pressure to the removal roller 120. In addition, the clamping device 170 has been moved away from the removal roller 120 before it is deposited at the depositing position B so that the wound-up material part 20a can be detached from the removal roller 120.

Figure 11:
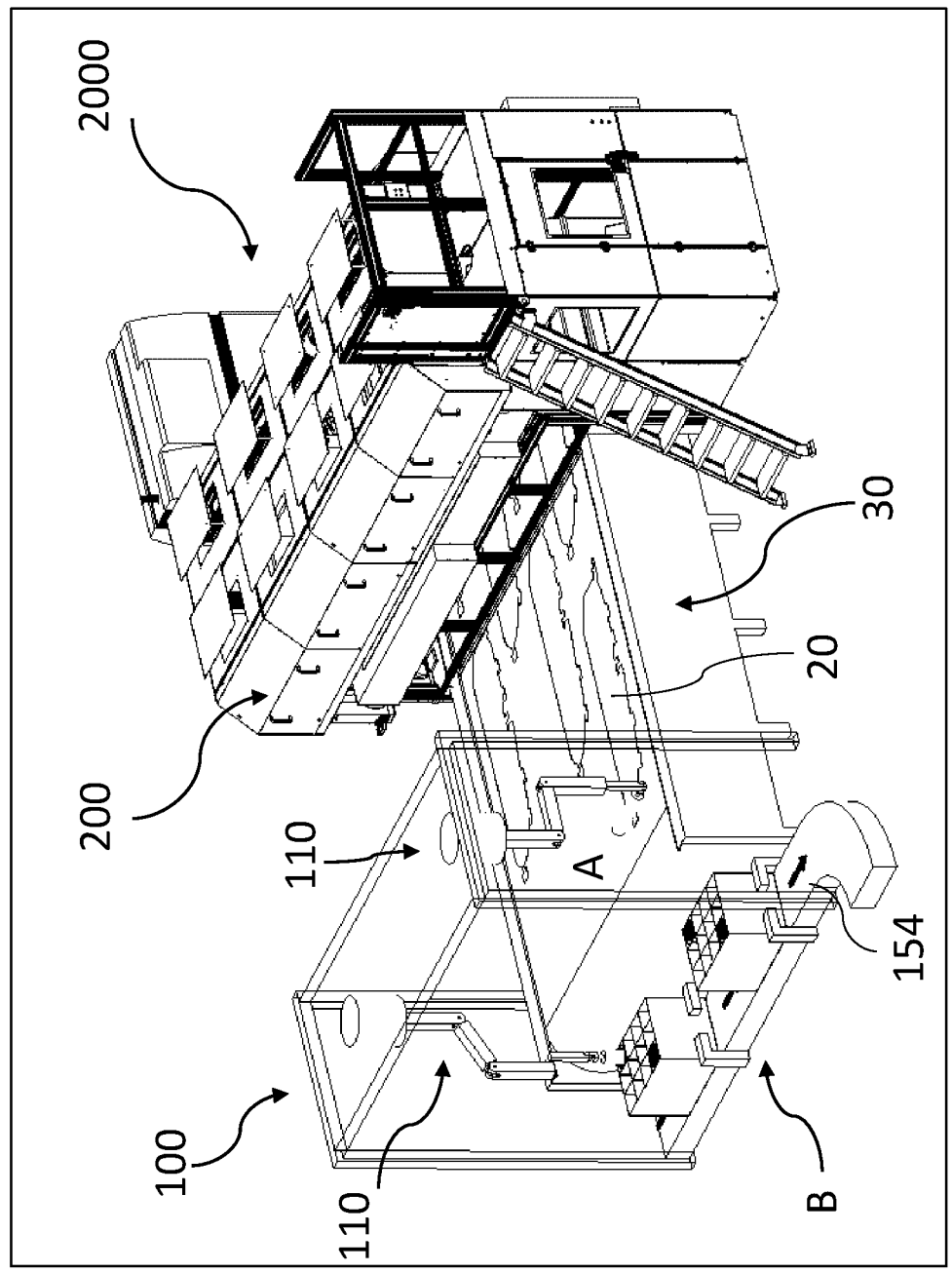
FIG. 11 shows a perspective view of a facility for cutting and transporting fabric material parts.

FIG. 11 shows a schematic view of a plant including a system for transporting away material parts 20. A processing device 200, which is configured, for example, as a laser cutting device and cuts material parts, in particular fabric material parts 20 used for airbag production, is shown in the right-hand area.

The material parts 20 or fabric material parts 20 to be received are, as described above, each received by one of the removal rollers 120 and conveyed into the transport containers 151 in the area of the depositing position B by means of the winding device 110 and deposited there in the depositing regions 153.

The configuration according to the invention is particularly advantageous because only a small amount of space is required to store and transport the completely cut material parts due mostly very large cut-out material parts being wound up. This is especially true in comparison to manual removal and transport of unwound material parts and represents very large savings of space.

FIG. 12 shows a method flow of the method according to the invention. In step S10, the at least one (fabric) material part 20 is adhered to a rotatable removal roller 120 of the winding device 110 in the area of a removal position A. In step S20, the adhered material part 20 is wound up by rotating the removal roller 120 until the material part 20 is completely wound up. In step S30, the removal roller 120 with the wound-up (fabric) material part 20a is moved to the depositing position B and, in step S40, the wound-up (fabric) material part 20a is detached and deposited in the transport container 151 in a depositing region 153.

The system for transporting away fabric material parts 20, as shown in FIGS. 9, 10 and 11, further comprises a conveyor belt 154 on which the empty transport containers 151 are transported to the depositing position B and are transported away after being filled.

A plurality of transport containers 151 are positioned on the conveyor belt 154, with a respective transport container 151 being positioned on the conveyor belt 154 at a specific position assigned to the winding device 110. Separating means or stopping means 155 are provided which allow the transport containers 151 to be positioned on the conveyor belt 154 in order to assign a transport container 151 to a winding device or to define the exact position of the transport container 151 in order to store the fabric material parts 20.

A control (not shown) detects, for example optically via a camera or a light barrier, that a fabric material part 20 is in a position close to the removal position A for receiving the fabric material part 20. Then, the removal roller 20 is positioned so that the fabric material part 20 can adhere to it. To do this, the winding device 110 moves approximately to the center line of the fabric material part 20 and lowers the removal roller 120 to the conveying level there so that the fabric material part 20 is taken by the suction and/or gripping device 121, 122 of the removal roller 120 and can adhere to the surface 124 of the removal roller 120. After either the gap 121a of the gripping device 121 is sufficiently closed or a negative pressure has been applied to the suction device 122 long enough, the control may initiate a rotational movement of the removal roller 120. A camera or one or more sensors on the removal roller 120 may also be used to detect that the fabric material part 20 is adhering to the surface 124 of the removal roller 120 and the rotational movement can be started. The duration of the rotational motion is determined by the length of the fabric material part 20 to be wound up and the diameter of the removal roller 120. After the fabric material part 20 has been wound up because the removal roller 120 has completed the required number of revolutions, the winding process is complete. Then, the clamping device 170 of the winding device 110 can be folded out in order to prevent unwinding of the wound-up fabric material part 20a from the removal roller 120. The removal roller 120 with the clamped and wound-up fabric material part 20a is pivoted or moved to the depositing position B via corresponding rotational movements of the joints 142, 143, 144 or translatory movements of the articulated arms 132, 133 and 134/135. There, depending on the alignment of the depositing regions, the removal roller 120 is brought into an insertion direction that corresponds to the alignment of the depositing regions 153. Then, the removal roller 120 with the wound-up fabric material part 20 is at least partially introduced into the depositing region 153, which may also be referred to as a slot. Before or after the wound-up fabric material part 20a is introduced into the depositing region 153, the clamping device 170 is released from the wound-up fabric material part 20 so that it can be detached from the removal roller 120 in order to remain or be deposited in the depositing region 153. As an alternative or in support, positive pressure may be output via the suction device 122, thereby supporting or enabling detachment of the wound-up fabric material part 20a from the removal roller 120. If a gripping device 121 is implemented, the gap 121a is opened in such a way that the fabric material part 20 can be detached from the removal roller 120. The control of the removal device 100 may determine, optically by means of a camera or via sensors in the transport container 151, which depositing regions 153 of the transport container 151 are empty or occupied in order to determine the next free depositing space or depositing region 153 for a wound-up fabric material part 20a and to position the winding device 110 or the removal roller 120 accordingly. When the controller determines that all depositing regions 153 of a transport container 151 are full, it is transported away via the conveyor belt 154 and a new or empty transport container 151 is moved to the depositing position B.

The gripping device 121 described may be formed as an alternative to the suction device 122 or as an additional structure on the removal roller 120.

The removal device according to the invention is preferably used in cutting systems for airbag production. In particular, the advantage achieved here is that the fabric material parts 20, which are sometimes very large and have complex contours, have to be transported further very carefully. Winding up the fabric material parts 20 in accordance with the invention saves a lot of space for transport. In addition, the wound-up pieces of fabric material 20 in the transport containers are also well protected.

The invention claimed is:

1. A removal device for removing at least one pliable material part from a conveyor device, comprising:
    at least one winding device including a receiver which is moved to a removal position above the conveyor device and is configured to contact a region of a material part to be removed and to receive the material part to be removed from the conveyor device and to wind it up around the receiver,
    wherein the at least one winding device or the receiver is pivotable in its orientation after the material part to be removed has been wound up and is movable to a depositing position, wherein the at least one winding device is configured to convey the material part wound around the receiver to a transport container at the depositing position and to deposit the wound-up material part in a wound-up state.

2. The removal device according to claim 1, wherein a plurality of winding devices are arranged and each winding device is assigned to a region of the conveyor device and the at least one winding device is movable separately at the level of the conveyor device and from a receiver position to a depositing position.

3. The removal device according to claim 1, wherein the receiver comprises a gripping device and a suction device in order to adhere a material part incoming on the conveyor device to a surface of the receiver.

4. The removal device according to claim 3, wherein the suction device has one or more openings arranged on the surface of the receiver, wherein the one or more openings are distributed as grooves or rows of openings on the surface of the receiver.

5. The removal device according to claim 4, wherein the one or more openings are subjected to negative pressure or positive pressure to adhere or detach an incoming material part to or from the surface of the receiver.

6. The removal device according to claim 3, wherein the gripping device forms a gap between the surface of the receiver and the gripping device, into which gap a material part incoming on the conveyor device is inserted and wherein the gripping device reduces an opening of the gap after a material part has been inserted in order to effect a clamping of the material part to the receiver or wherein the receiver performs a rotational movement about a longitudinal axis after a material part has been inserted into the gap in order to wind up the material part around and onto the receiver.

7. The removal device according to claim 1, wherein the receiver is rotatably hinged on the at least one winding device in order to carry out a rotational movement about a longitudinal axis after the material part to be received has adhered in order to wind up the material part around the receiver.

8. The removal device according to claim 1, wherein the at least one winding device includes a clamping device which fastens the wound-up material part to the receiver.

9. The removal device according to claim 8, wherein the clamping device is attached to the receiver or to a holder of the receiver and is movable toward the receiver after a winding process in order to fix the wound-up material part to the receiver and is movable away from the receiver with the wound-up material part during a depositing process in order to release the wound-up material part.

10. The removal device according to claim 1, wherein an axis of rotation of the receiver in an area of removal position of the material part from the conveyor device is oriented substantially horizontally and transversely to a conveying direction of the conveyor device and is oriented horizontally, inclined or vertically in the depositing position.

11. The removal device according to claim 1, wherein the receiver is movable upwards from a conveying plane after the material part has adhered to the receiver, a winding process of the receiver taking place at a predetermined distance from the conveying plane.

12. The removal device according to claim 1, wherein the at least one winding device includes at least one joint which allows for the receiver to be positioned and pivoted and the at least one winding device is adjustable in height in order to be raised from a conveying plane or from the removal position and, after pivoting, is movable to a level of a transport container or a depositing position.

13. The removal device according to claim 1, wherein the receiver is configured as a removal roller.

14. The removal device according to claim 1, wherein the material part is flexible and pliable, has one or more layers, is an airbag or OPW fabric, and comprises technical textiles, cloths, fiber-reinforced fabrics, non-woven fabrics, carbon fiber, paper, glass fiber, seat covers, coated or uncoated, single or multi-layer metal or plastic foils.

15. A removal system including a removal device according to claim 1, further comprising at least one transport container which receives at least one wound-up material part and is positioned in an area of the depositing position in order to receive the wound-up fabric material part from the receiver.

16. The removal system according to claim 15, wherein the transport container has a partitioning structure in order to receive one wound-up material part each in depositing regions formed by the partitioning structure; and wherein the transport container has a plurality of depositing regions, each depositing region having a depth greater than a diameter or a width of the depositing region and the depth of the depositing region corresponding to at least 50% of the width of a material part.

17. The removal system according to claim 15, wherein the removal position is arranged to the right and left or to the side of the conveyor device, and further comprising a conveyor belt on which one or more transport containers are transported to the depositing position and, after being filled with one or more wound-up fabric material parts, are transported away from the depositing position; wherein a conveying direction of the conveyor belt runs transversely to the conveying direction of the conveying device in the region of the depositing position.

18. A facility for cutting and transporting fabric material parts, comprising: a removal system according to claim 15 and a processing unit for cutting material parts from a material web resting on the conveyor device.

19. A system for transporting away fabric material parts, comprising:
a conveyor device with a horizontally arranged conveying plane, on which at least one fabric material part is conveyed; and
a removal device according to claim 1.

20. A method for removing a material part resting on a conveyor device, comprising:
adhering at least one material part in a region of a removal position to a rotatable receiver of a removal device;
winding the adhered material piece onto the rotatable receiver by rotating the receiver;
moving the rotatable receiver with the wound-up material part to a depositing position; and
depositing the wound-up material part in the wound-up state in a transport container at the depositing position.

* * * * *